United States Patent [19]
Johnston

[11] 3,854,747
[45] Dec. 17, 1974

[54] LATERALLY AND LONGITUDINALLY EXTENSIBLE TRUCK

[76] Inventor: James F. Johnston, P.O. Box 168, Union, Mo. 63084

[22] Filed: Mar. 28, 1974

[21] Appl. No.: 455,641

[52] U.S. Cl. .............................. 280/34 B, 280/47.24
[51] Int. Cl. ............................................. B62d 21/14
[58] Field of Search... 280/34 A, 34 B, 34 R, 47.24, 280/47.25, 47.26, 62, 63; 296/26

[56] References Cited
UNITED STATES PATENTS

| | | | |
|---|---|---|---|
| 1,535,712 | 4/1925 | Becker | 280/34 R |
| 1,679,107 | 7/1928 | Woldt | 280/34 B |
| 2,780,474 | 2/1957 | Harrison | 280/34 A |
| 3,125,350 | 3/1964 | Thiermann | 280/34 A |
| 3,134,607 | 5/1964 | Doll | 280/34 A |

*Primary Examiner*—Robert R. Song
*Attorney, Agent, or Firm*—Rogers, Ezell & Eilers

[57] ABSTRACT

A wheeled truck or cart having a rectangular bed frame expandable laterally and longitudinally with lateral and longitudinal slide tracks formed of angle members, affording sufficient contact of the sliding elements to give good cantilever support throughout their range of adjustment so that the cart may be adjusted in width and lengths to support loads of different sizes on its flanged bed which is rigid in any of its adjusted positions.

10 Claims, 15 Drawing Figures

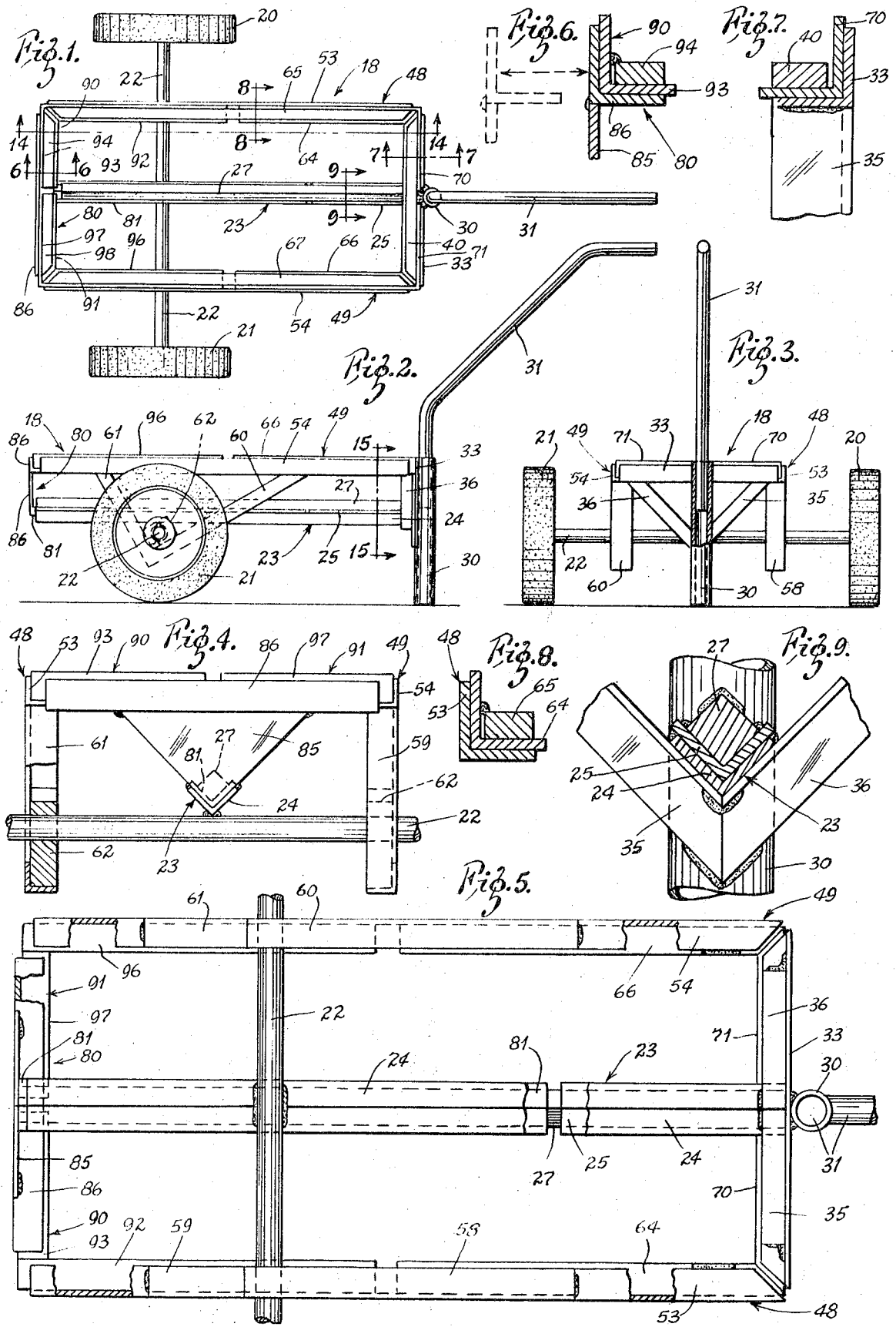

PATENTED DEC 17 1974 3,854,747

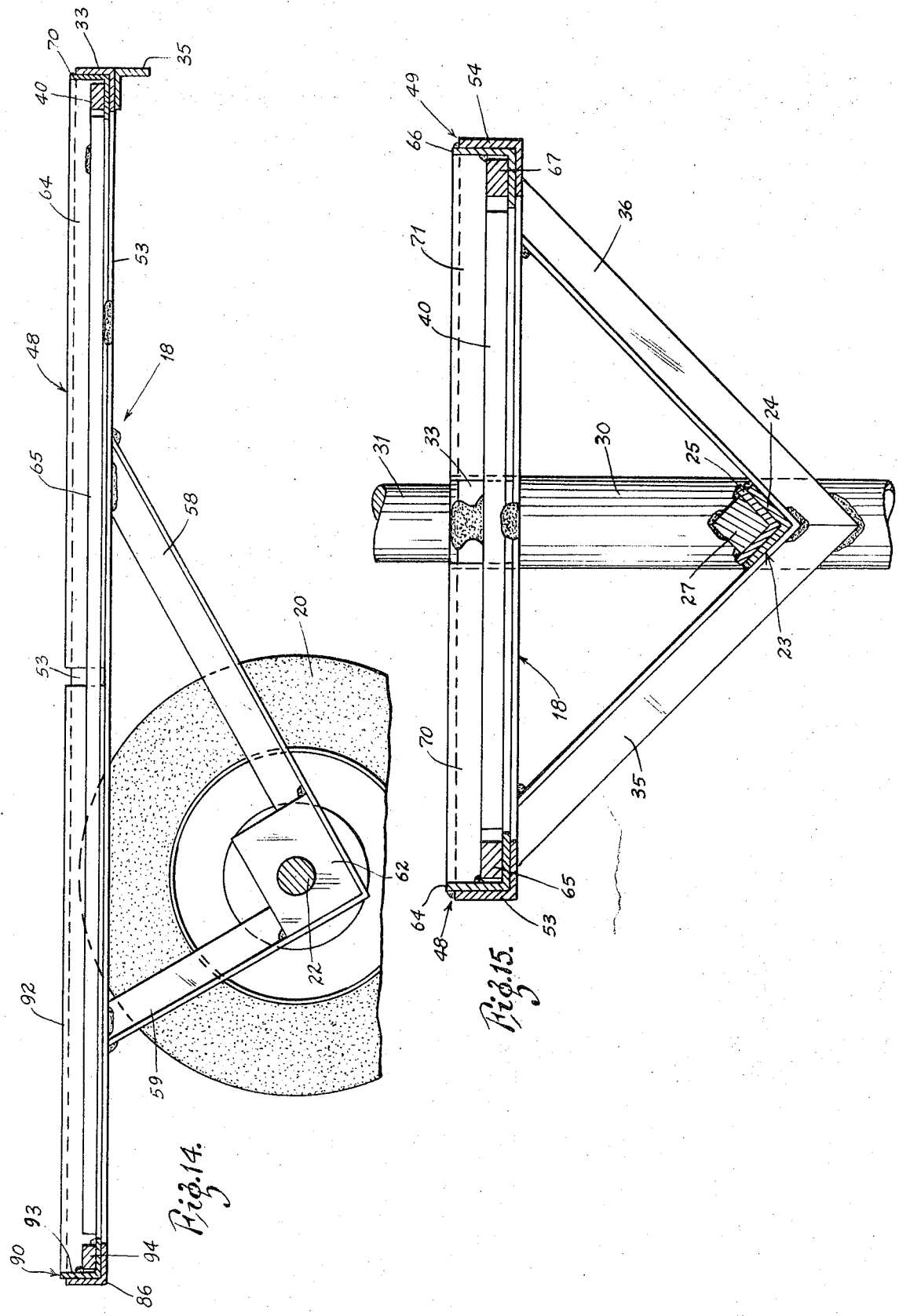

{ 3,854,747 }

LATERALLY AND LONGITUDINALLY EXTENSIBLE TRUCK

BACKGROUND OF THE INVENTION

It is known that carts of different kinds have been made with expandable and contractable beds. Almost all of these have had such arrangements as bolt and wing-nut means to secure connections between the sliding parts, which are slow and awkward in their adjustments and interfere with the smooth upper bed surfaces of the cart. Also, they do not afford a rigid and strong structure.

OBJECTS OF THE INVENTION

Objects of the invention therefore are to provide a truck that has a bed to receive loads such for example as cartons, having extensions both in width and length, that yet provides in all conditions of adjustment a rectangular bed with upstanding flanges on all sides to restrain lateral slipping of the load. Another object is to provide such a bed that has substantially level, horizontal portions, upon which the load can rest in all conditions of adjustment.

A further object is to provide a cart of this type which has track slide engagements between the adjustable parts, that have long enough over-and-under engagements to enable the parts to have cantilever support in all positions of adjustment, thereby to avoid the necessity of having screws, bolts or the like securing them together.

Other objects will appear in the description to follow.

In the drawings

FIG. 1 is a plan view of the truck or cart in contracted form;

FIG. 2 is a side elevation of FIG. 1;

FIG. 3 is a rear elevation, partly in section, of FIG. 1;

FIG. 4 is an enlarged front view, partly in section, with the wheels removed;

FIG. 5 is an enlarged bottom view, partly in section, with the wheels removed;

FIG. 6 is an enlarged section on the line 6—6 at the left end of FIG. 1, the dashed lines showing the extension of the T-frame;

FIG. 7 is an enlarged transverse section on the line 7—7 at the right end of FIG. 1;

FIG. 8 is an enlarged transverse section across one side of the frame on the line 8—8 of FIG. 1;

FIG. 9 is an enlarged transverse section through the spine or backbone frame taken on the line 9—9 toward the right of FIG. 1;

FIG. 14 is an enlarged section along the line 14—14 of FIG. 1; and

FIG. 15 is an enlarged section on the line 15—15 of FIG. 2.

DESCRIPTION OF THE PREFERRED EMBODIMENT

This tool cart comprises a main frame 18, including a pair of wheels 20 and 21 mounted on an axle 22 rigidly secured to a backbone or spine frame 23. Except for the obviously different, the parts of this truck are preferably made of steel, although other materials may be used on occasion.

Figure 11:
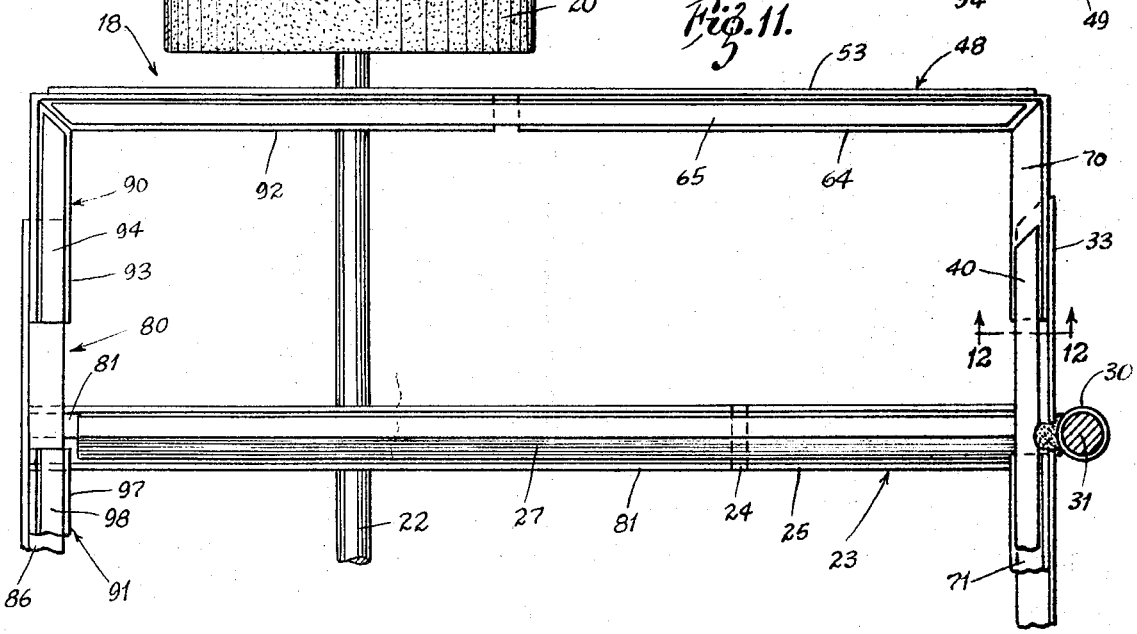
FIG. 11 is a plan view to an enlarged scale showing the lateral extension of the frame.
Figure 13:
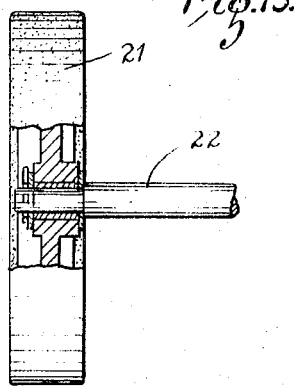
FIG. 13 is an elevation partly in section of one of the wheels showing its mounting.

This backbone 23 consists of an angle 24 open upwardly as illustrated, and a shorter angle 25 nested in as shown in FIG. 9 and welded to it at its rear portion. This upper, short, angle 25 receives a rectangular rod 27, that projects forward from the short angle 25 and overhangs the forward part of the angle 24. The two angles 24 and 25 and the rod 27 are all welded together as shown in FIGS. 9 and 11, at several points. As will appear, the angles 24 and the cantilevered rod 27 provide a slide track between them, of non-circular cross section. This track is relatively long ahead of the short angle 25.

At the rear of the assembly of the backbone frame 23, consisting of the two angles 24 and 25 and the bar 27, is welded a vertical support 30, in the form of a tubular member that extends down to form, with the two wheels 20 and 21, a stable three-point support for the truck. The tube extends upwardly and constitutes a socket to receive the lower end of a handle 31. The handle may be pivoted in the socket, and may be removed, but has a long enough socket engagement to prevent its being pulled out inadvertently.

Above the spine 23, a cross member 33 is welded to the vertical support 30. It is angular in cross section and as will appear, forms a part of the bed frame of the truck. Two braces 35 and 36 formed also of angles are beveled and welded at their lower ends to the support 30, and at their upper ends to the cross member 33. FIG. 7 shows a sectional view of the angle 33 that is welded to the upper end of the brace 36.

A cross bar 40 is also welded to the support tube 30. The vertical flange of the cross member 33 is cut away at its middle, to permit the bar 40 to be welded to the support 30. The bar 40 extends laterally in both directions and is spaced above the horizontal flange of the horizontal angle cross member 33, and is also spaced forwardly from the vertical portion thereof. As will be seen, this leaves tracks between the bar 40 and the member 33 for a purpose to appear. Also, the top surface of the bar 40 comprises a part of the load receiving means of the truck.

The foregoing parts constitute the rigid, basic framework 18 for the truck, and also comprises a portion of the loadcarrying bed. All of these parts are made of a rigid material. The frame is secured to the axle 22 and is given three-point support by the wheels 20 and 21, and the tube 30.

There are two laterally extensible L-shaped side frames, one on each side of the truck, each being supported by the basic frame 18 and the axle 22. The side frames are generally designated at 48 and 49. They are symmetrical in design so that the description of one can relate to both.

Each side frame comprises an elongated angle member of the same type as the angle 33, having one flange disposed horizontally and its other vertically, as shown. The side frame 48 has such an angle member 53. The side frame 49 has a similar angle member 54.

The angle members 53 and 54 are rigidly secured to angle braces that extend down to be mounted slidably on the axle 22. These appear in FIG. 5, but are best shown in FIG. 2, on the angle member 54 of the side frame 49. The angle member 53 of the side frame 48 has two angular braces 58 and 59, while the angle member 54 of the side frame 49 has similar braces 60 and 61. Bearing blocks 62 may be mounted at the intersection of the braces to give good support for the axle 22, these bearings being designed to permit them to slide along the axle 22, as will appear. The braces 60 and 61, the angle blocks 63 and the elongated frame angle 54 are all rigidly welded together to constitute the side frame 49, as are the corresponding parts on the other side that constitute the side frame 48. The description thus far shows that the side frames 48 and 49 are supported on the axle 22.

The angles 53 and 54 of the elongated side frame members 48 and 49, toward the rear of the truck, are nested with and welded to angles that extend approximately half-way forward of the angles 53 and 54. The side frame 48 has the short angle 64, as shown in FIGS. 1 and 8. Welded to the top of the angle 64 is an elongated bar 65 that is substantially of the same length as the angle iron 53. The bar 65 overhangs the forward horizontal end of the angle 53 in cantilever fashion, providing a track to receive an angle member as will appear. These parts are of strong, rigid material. The side frame 49 has a similar short angle 66 and bar 67 forming a slide track.

Figure 12:
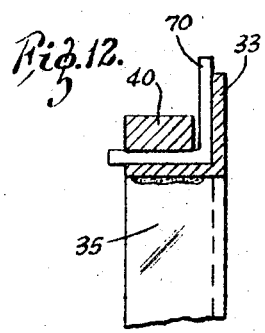
FIG. 12 is an enlarged section on the line 12—12 of FIG. 11.

These two short angles 64 and 66 of the side frames 48 and 49, respectively, have inwardly projecting extensions at 90°, that engage the tracks on the cross member 33 of the main frame. These angle parts 70 and 71, of the side frame short angles 64 and 65, are slidable into the track formed between the angle 36 and the bar 40, as shown in FIGS. 11 and 12, where they are supported in cantilever fashion for their adjustments, and are held against twisting and fore and aft movements.

The foregoing shows that the side frames 48 and 49 are slidably supported on the axle 22, and also are slidably supported by the track between the laterally projecting angle 33 and the bar 40 thereover. The track helps to support the side frames against any tilting, since there is contact for the rear support over and under the inturned angular extensions 70 and 71 throughout their inward and outward adjustments. The sliding fit of the side frames on the axle 22, and the sliding fit of the inward extensions 70 and 71 in the track permit the side frames to be moved inwardly and outwardly along the axle 22 and the track to change the width of the truck. The friction of the cantilever support of the side frames on the track of the member 33 and on the axle is enough to prevent inadvertent displacement of the frames. The fit of the vertical flanges of the angles 70 and 71 in the slot between the angle 33 and a rod 40 (see FIG. 7) holds the side frames against fore and aft movements.

Means provide a forward longitudinal extension to the truck bed frame that is itself both laterally and longitudinally adjustable.

It will be remembered that the angle 24 that is the spine of the truck is welded to the axle 22, and that the rectangular bar 27 is spaced from it by the presence of the short intermediate angle 25 at the rear of the spine. Ahead of the intermediate angle 25, the bar 27 and angle 24 project forwardly with a track-forming, non-circular space between them. This track is parallel to the track between the side frames, formed between the side angle 53 and the bar 65, ahead of the short angle 64, and the corresponding track on the other side.

A T-shaped forward frame support, generally designated 80 has a longitudinal angle 81, similar to the angle 25, and inserted in the track between the bar 27 and the bottom angle 24, thus being guided slidably and supported in cantilever mode in that track.

The forward end of the angle 81 is welded to a triangular plate 85 that supports a transverse angle 86 welded across its upper end. This T-shaped frame sub-assembly has its longitudinal angle 81 inserted into the slide gap between the bar 27 and the angle 24. As noted, this track extends about three-quarters of the length of the truck, which not only gives a considerable extension range for the cross-bar 86, but also gives a long area of contact between the angle 81 and the track so that it can be firmly supported in cantilever mode at any position in a considerable range of adjustments. It will be evident that the T-shaped support tracks longitudinally on the frame, parallel to the tracking of the side frames 48 and 49; and that the angle bar 86 extends outwardly substantially to the two side frames. The non-circular, angular shape of the slide parts restrains twisting of the T-frame, and holds the transverse angle 86 horizontal.

The longitudinal extension of the truck also includes L-shaped angle slides 90 and 91 that engage in the tracks at the forward ends of the two side frames 48 and 49 and which also can rest on and be supported by the transverse angle 86. As shown in FIG. 11, the L-shaped member 90 has a longitudinal angle portion 92 and a transverse angle 93. The transverse angle 93 has a bar 94 welded to it to make it more rigid and to bring the bed level up to equal that of the other bars on the rest of the frame. The angle portion 92 slides fore and aft in the longitudinal slide space between the forwardly-projecting ends of the side frame angle 48 and its bar 65. When the truck bed frame is extended longitudinally the maximum amount, the wheels are still somewhat ahead of the middle, so that the truck has stability on its three support elements, viz. the two wheels 20 and 21, and the support 30.

The other L-shaped slide 91 is made in the same fashion with a longitudinal portion 96 slidable on the side frame 49, and a transverse portion 97 supported for lateral extension on the T-support 86. A bar 98 corresponds to the bar 94.

Assembly and Use of the Truck

The truck is shown in compact condition in FIGS. 1, 2 and 3. This is appropriate for its hauling cartons of a certain size which can either be rested on the frame or can be inset therein to have three point support by the two side frames 48 and 49 and the spine 23. In its compact condition, the truck's side frames 48 and 49 are slide in as far as they will go, the L frames 90 and 91 are backward as far as they will go, and the T frame 80 is backward as far as it will go. In this condition, the vertical flanges of the angles 70, 71 90 and 91 form a ledge around the bed, and the several rods 40, 65, 67, 94 and 98 are at the same level to support the load evenly.

If it is desired to increase the width of the bed frame of the truck, the side frames 48 and 49 are pulled laterally. This causes the rear angles 70 and 71 of the two side frames 48 and 49 to slide within the tracks provided by the rear cross member 33 and the rear cross bar 40. At the same time the forward L frames are pulled laterally, drawing their angles 90 and 91 laterally outward, riding on the top of the cross member 86 of the T-frame 80. In this movement, the side frames 48 and 49 cause their bearing blocks 63 to slide on the axle 22. When a new position is reached, such as that illustrated in FIG. 11, the side frames are still supported on the axle 22 and in the rear track, and also on the forward cross member 86 of the T-frame 80, which in turn is supported in the track of the spine. The load, such as cartons, is then rested on the bed frame, preferably fitting between its four vertical flanges. The parts will remain in adjusted position because the load increases the resistance to further expansion or contraction.

Figure 10:
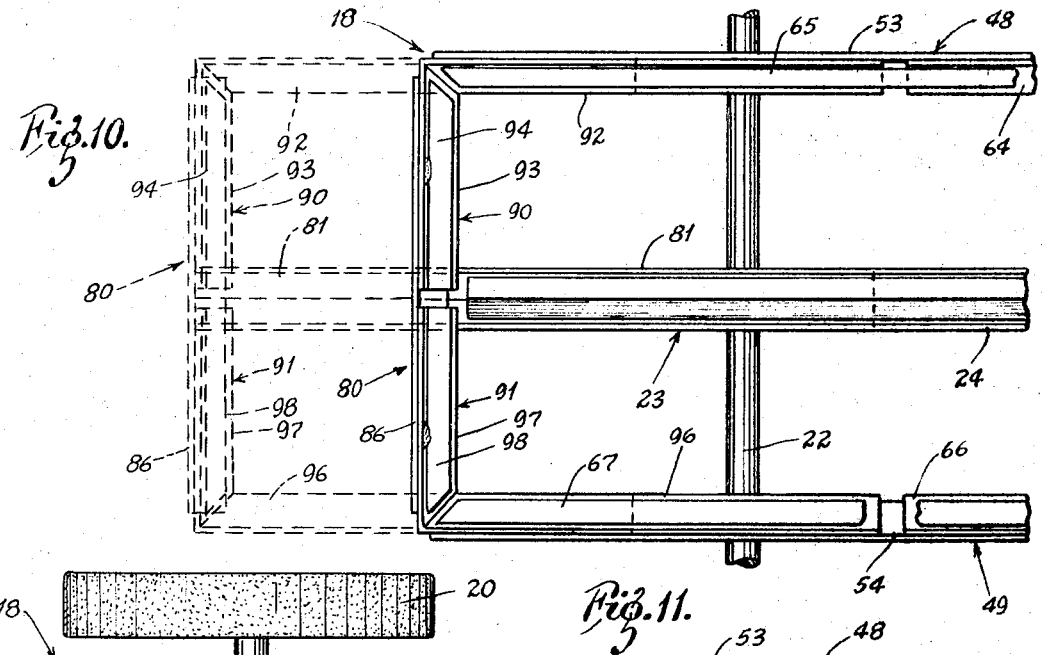
FIG. 10 is a fragmentary view to an enlarged scale showing the longitudinal extension of the frame.

If it is desired to lengthen the frame, with or without increasing its width, the T-frame 80 is pulled lengthwise, causing its longitudinal angle 81 to slide in the track between the spine 23 and the bar 27. This pulls the cross angle 86 forwardly as shown in dashed lines in FIG. 10. Then the two L-shaped frames 90 and 91 are pulled forwardly sliding in their respective longitudinal tracks, until their cross members 90 and 91 can re-seat in the cross angle 86 of the T-frame 80. In this new position, the long remaining interengagement between the angles 92 and 93 with their slide slots provides strong cantilever support, along with a like engagement of the T-slide and the spine 23.

Thus the truck can be disposed in its compact form or it can be widened and lengthened. The narrowing and shortening is, of course, done by reversing the previously-described steps for widening and lengthening it. It is not required that both sides be widened the same. The tracking arrangement is such that there is good support for the frame members in all of these various positions so that heavy loads can be supported. There is ample bearing area of the slides in their tracks both from below and above to give cantilever rigidity when the parts are extended. The several bars 40, 65, etc., provide a substantially level horizontal load-bearing portion to the frame which nevertheless is below the bottom of the angles so that there is a flanged support. Even when the bed is extended, these bars provide sufficient level support. This means that if desired, the bed of the truck can be made to fit cartons to be transported quite closely so that they cannot slide when the truck is being moved. In other words, the frame will be sized to hold the cartons within the flanges and prevent such movement of the load.

The wheels are held in place by conventional means such as cotter pins and the like. The handle preferably is removable. When the wheels are removed and the handle is removed, the truck is in a compact condition that is convenient for its being transported or packed.

This truck does not require bolts or the like to hold it in adjusted position as the tracks into which the various sliding members fit are relatively long and the parts are not subject to being rocked out of shape.

Various changes and modifications may be made within this invention as will be readily apparent to those skilled in the art. Such changes and modifications are within the scope and teaching of this invention as defined by the claims appended hereto.

What is claimed is:

1. In a truck: a main elongated frame; first and second support means for the frame, the first comprising two laterally spaced supporting elements and the second comprising at least one supporting element longitudinally spaced from the first, so that the main frame has at least three-point support for stability; a bed frame, the bed frame having one laterally extending member fixedly mounted on the main frame, and side frames supported on the laterally extending member and on the laterally spaced supporting elements, the bed frame including at least one extension frame, the bed frame and extension frame having elongated slide-track interengagement above and below with one of the said frames sliding between upper and lower parts of the other, whereby the extension frame can slide out from the main frame and yet be confined to linear displacement.

2. In the truck of claim 1: the laterally spaced supporting elements of the first support means comprising two wheels and axle means therefor, the axle means being firmly fixed to the elongated main frame.

3. In the truck of claim 2: the extension frame being a side frame, the track interengagement being with the laterally extending member fixed to the main frame, and it also having sliding support on axle means, whereby it has sliding support on the main frame and additional support on the axle means.

4. In the truck of claim 1: the bed frame having horizontal and vertical portions, the horizontal portions being adapted to support a load and the vertical to restrain it against lateral movements.

5. In the truck of claim 1: the extension frame being an end frame, and having the sliding interengagement lengthwise of the main frame, whereby to change the length of the bed frame, the laterally extending member on the bed frame and the extension frame having horizontal support portions that are disposed near opposite ends of the truck.

6. In the truck of claim 5: the side frames having transverse portions with the same slide track type of interengagement with the laterally extending member, and having sliding interengagement with the axle means, whereby they can be slid in or out laterally to change the width of the bed frame.

7. In the truck of claim 6: additional extension frames, one on each side, said additional extension frames having the same type slidable track interengagement with the side frames, whereby to change the lengthwise dimensions of the side frames, and having inwardly extending end portions to slidably engage and be supported by the horizontal support portion thereof.

8. In the truck of claim 7: the bed frame including members to provide the same elevation for the under-parts of loads supported on the bed frame.

9. In the truck of claim 5, the main frame comprising an elongated rigid member having a non-circular groove therein, and a rod mounted rigidly over the groove and providing a track-slot between them; the extension frame having an elongated member complementary in shape to the groove and slidable lengthwise in the groove, the non-circular groove restricting twisting movement of the extension frame.

10. In the truck of claim 1: the main frame comprising and elongated spine member, the laterally spaced supporting elements comprising a transverse axle secured to the spine member between its ends, with a wheel at each end; the spine having the second support means at its end and comprising a vertically disposed element engageable with the ground and projecting upwardly, and a handle engageable with the upwardly projecting part of the vertically disposed element.

* * * * *